United States Patent
Torres et al.

(10) Patent No.: US 8,687,493 B2
(45) Date of Patent: Apr. 1, 2014

(54) METHOD AND SYSTEM FOR INROUTE BANDWIDTH ALLOCATION SUPPORTING MULTIPLE TRAFFIC PRIORITIES IN A SATELLITE NETWORK

(75) Inventors: Robert Torres, New Market, MD (US); John Border, Adamstown, MD (US); Patrick Stevens, Mount Airy, MD (US); Jun Xu, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 18 days.

(21) Appl. No.: 13/306,181

(22) Filed: Nov. 29, 2011

(65) Prior Publication Data

US 2013/0136004 A1    May 30, 2013

(51) Int. Cl.
*H04W 72/04*    (2009.01)
*H04B 7/185*    (2006.01)

(52) U.S. Cl.
CPC ................................. *H04B 7/18584* (2013.01)
USPC .......................... 370/235; 370/468; 455/428

(58) Field of Classification Search
USPC .......... 370/229–235, 328–338, 468; 455/427, 455/428
See application file for complete search history.

(56) References Cited

U.S. PATENT DOCUMENTS

| 2003/0032391 A1* | 2/2003 | Schweinhart et al. | 455/12.1 |
| 2006/0215628 A1* | 9/2006 | Olariu et al. | 370/348 |
| 2007/0165524 A1* | 7/2007 | Mascolo | 370/230 |

* cited by examiner

*Primary Examiner* — Pao Sinkantarakorn
(74) *Attorney, Agent, or Firm* — K&L Gates LLP (57) ABSTRACT

A method for inroute bandwidth allocation supporting multiple traffic priorities in a satellite network including generating a backlog report, transmitting the backlog report to an inroute group manager, receiving a bandwidth allocation from the inroute group manager, and servicing priority queues and transmitting data to a satellite based on the bandwidth allocation from the inroute group manager.

27 Claims, 6 Drawing Sheets

METHOD AND SYSTEM FOR INROUTE BANDWIDTH ALLOCATION SUPPORTING MULTIPLE TRAFFIC PRIORITIES IN A SATELLITE NETWORK

BACKGROUND

In the return direction on a satellite network, multiple very small aperture terminals (VSATs) may share one inroute gateway station with a certain amount of bandwidth when transmitting data. Because the VSAT traffic has different priorities, and VSATs may have different service plans, the different types of traffic data may be regulated in different ways to meet the quality of service (QoS) requirements. In addition, due to limited bandwidth, an inroute to the gateway station may be congested for certain periods of time. Without appropriate traffic regulation, low priority traffic may block high priority traffic, causing unsatisfied QoS.

Several things may be considered when allocating bandwidth to inroute traffic. The bandwidth may be allocated based on the actual demand for the purposes of efficient spectrum utilization. A VSAT may report its backlog to obtain bandwidth on a return channel for transmitting data. Some traffic classes, for example, interactive traffic, may need to have higher priority than other traffic, such as streaming and bulk traffic, when granting bandwidth, but should not be able to completely block lower priority traffic. Different VSATs may have different service plans. When the network is congested, a VSAT may experience degraded QoS, e.g., reduced service rate or longer latency. Fairness criteria may require that the reduced service rate be proportional to the VSAT's service plan. A VSAT may be allowed to occupy the whole channel at a scheduled time in order to transmit large sized bursts. A large burst may have a relatively lower percentage of overhead information.

BRIEF SUMMARY

It is an object of the present invention to provide a method and system for inroute bandwidth allocation supporting multiple traffic priorities in a satellite network.

In accordance with an aspect of the present invention, a method for inroute bandwidth allocation supporting multiple traffic priorities in a satellite network includes generating a backlog report, transmitting the backlog report to an inroute group manager, receiving a bandwidth allocation from the inroute group manager, and servicing priority queues and transmitting data to a satellite based on the bandwidth allocation from the inroute group manager.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION

Figure 1:
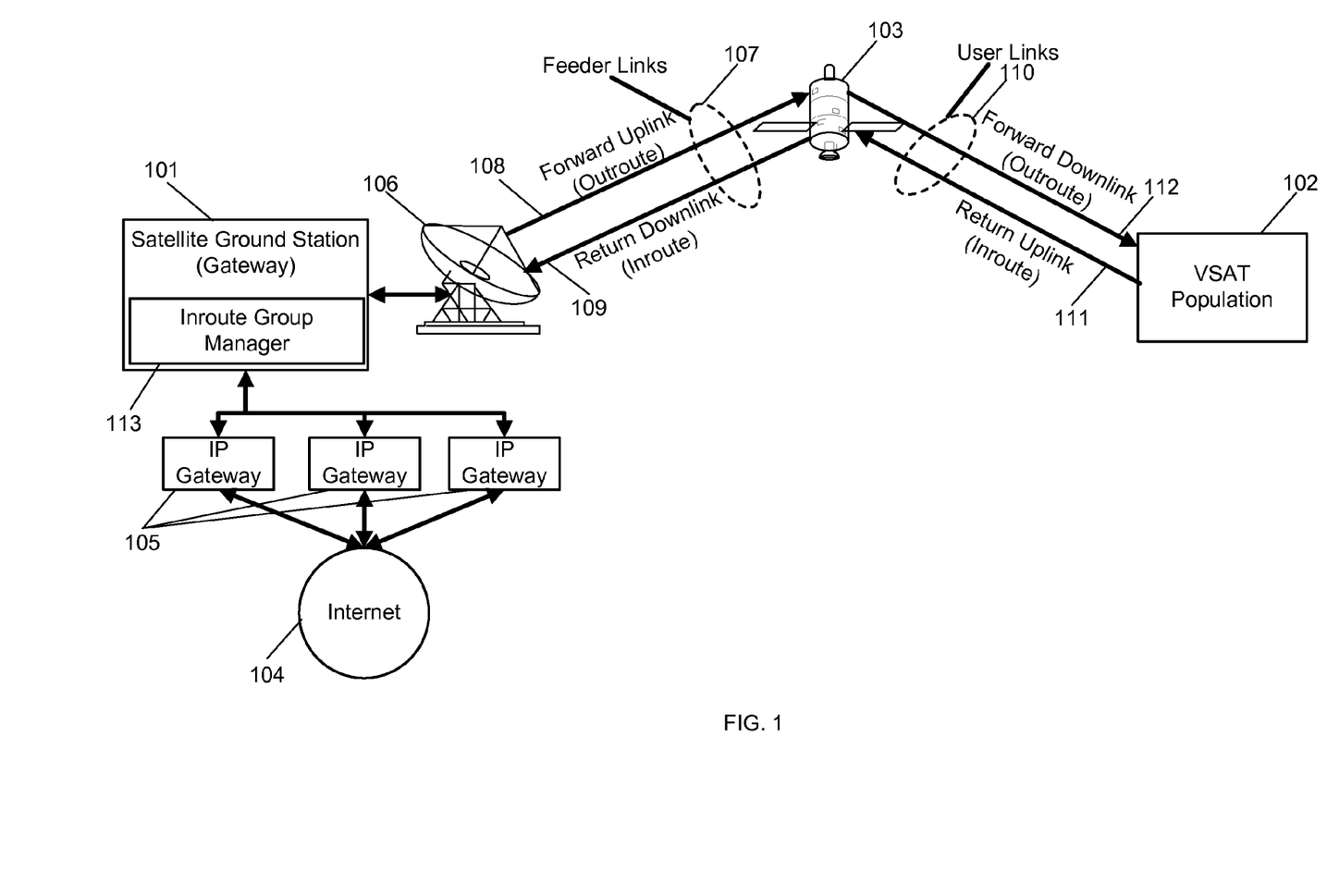
FIG. 1 depicts an exemplary satellite communications system for inroute bandwidth allocation.

FIG. 1 depicts an exemplary satellite communications system for inroute bandwidth allocation. The satellite communications system may include a satellite ground station, or gateway, 101, a Very Small Aperture Terminal (VSAT) population 102, a satellite 103, the Internet 104, IP gateways 105, and a RF terminal 106. The satellite communications system may be a shard access network.

The gateway 101 may be connected to the VSATs in the VSAT population 102 through the satellite 103. The gateway 101 may be high capacity, large antenna earth stations with connectivity to ground telecommunications infrastructure. The gateway 101 may be connected to the RF Terminal (RFT) 106. The RFT 106 may include an antenna, electronics and connectivity to allow for communications access to the satellite 103. The RFT 106 may be the physical equipment responsible for the sending and receiving of signals to and from the satellite 103, and may provide an air interface for the gateway 101.

The gateway 101 may include an Inroute Group Manager (IGM) 113. The IGM 113 may be a bandwidth controller running bandwidth allocation algorithms. The IGM 113 may assign bandwidth to the VSATs in the VSAT population 102 in the form of inroute and inroute groups, based in part on the VSATs' requests for bandwidth.

Feeder links 107 may carry data between the gateway 101 and the satellite 103, and may include a forward uplink 108 for transmitting data from the gateway 101 to the satellite 103, and the return downlink 109 for transmitting data from the satellite 103 to the gateway 101. User links 110 may carry data between the satellite 103 and the VSAT population 102, and may include the return uplink 111 for transmitting data from a VSAT to the satellite 103, and a forward downlink 112 for transmitting data from the satellite 103 to a VSAT. The forward uplink 108 and the forward downlink 112 may form an outroute, and the return uplink 111 and the return downlink 109 may form an inroute. An inroute may be a carrier at a specified frequency divided into multiple slots on which the IGM 113 may assign one, for Time Division Multiplexing, or multiple, for Spread Code Division Multiplexing, VSATs to utilize bandwidth in a non-contentious manner. An inroute group may be a set of inroutes or similar physical layer characteristics on which the IGM 113 balances the assignment of VSATs with bandwidth requests.

The VSAT population 102 may include a number of VSATs or Mobile Satellite Terminals, which may be used by end users to access the satellite communications system. A VSAT may include a remote satellite dish for receiving RF signals from and transmitting RF signals to the satellite 103, a satellite modem and other equipment for managing the sending and receiving of data, and one or more remote hosts, which may be computer systems or other electronic devices capable of network communications at a site remote from the gateway 101. For example, a VSAT may be used at a residence or place of business to provide access to the Internet 104.

The satellite 103 may be any suitable communications satellite for connecting the hub 101 to the remote hosts 116. For example, the satellite 103 may be a simple bent-pipe design geostationary satellite, which can accommodate innovations and variations in transmission parameters, operating in the Ka-band. The satellite 103 may use spot beams and frequency and polarization reuse to maximize the total capacity of the system. Signals passing through the satellite 103 in the forward direction, towards the VSATs, may be based on the DVB S.2 standard (ETSI EN 302 307) using signal constellations up to and including at least 16-APSK. The signals intended to pass through the satellite 103 in the return direction, toward the hubs, may be based on the IPoS standard (ETSI TS 102 354). Other suitable signal types may also be used in either direction, including, for example higher data rate variations of DVB S.2.

The gateway 101 may include the IP gateways 105. The IP gateways 105 may be the ingress portion of the local network at the gateway 101. Data from outside the gateway 101 may enter the gateway 101 through the IP gateways 105. The IP gateways 105 may include a spoofer, which may acknowledge TCP traffic sent to the gateway 101. The gateway 101 may be connected to the Internet 104 through the IP gateways 105. TCP traffic from the Internet 104 may enter the gateway 101 through the IP gateways 105. Remote terminals connected to VSATs in the VSAT population 102 may connect to the Internet 104 through the satellite 103 and the gateway 101.

Multiple IP gateways 105 may be connected to one gateway 101, sharing the bandwidth of the RFT 106. At each IP gateway 105, real-time (RT) and non-real-time (NRT) traffic flows may be classified into different priorities. These traffic flows may be processed and multiplexed before being forwarded to priority queues at the gateway 101. RT traffic may go directly to the gateway 101 RT priority queue, while NRT traffic flows may be serviced based on the respective priority and volume. The data may be further packed into DVB-S2 code blocks and stored in a code block buffer before transmission.

Data from the Internet 104 intended for a VSAT in the VSAT population 102 may be in the form of TCP packets, although the data may also be UDP packets or any other suitable IP packets, and may enter the gateway 101 at one of the IP gateways 105, where the spoofer may send TCP acknowledgement back to the sender of the TCP packets. The TCP packets may be processed and multiplexed by the gateway 101 along with TCP packets from the other IP gateways 105, where the IP gateways 105 may or may not have the same service capabilities and relative priorities. The TCP packets may then be transmitted to the satellite 103 on the forward uplink 108 using the air interface provided by the RFT 106. The satellite 103 may then transmit the TCP packets to the VSAT using the forward downlink 112. This may be the outroute. Similarly, TCP packets may enter the ingress at a VSAT in the VSAT population 102, be processed by the VSAT 102, and transmitted to the satellite 103 via the VSAT's air interface on the return uplink 111. The satellite 103 may then send the TCP packets to the gateway 101 using the return downlink 109. This may be the inroute.

Figure 2:
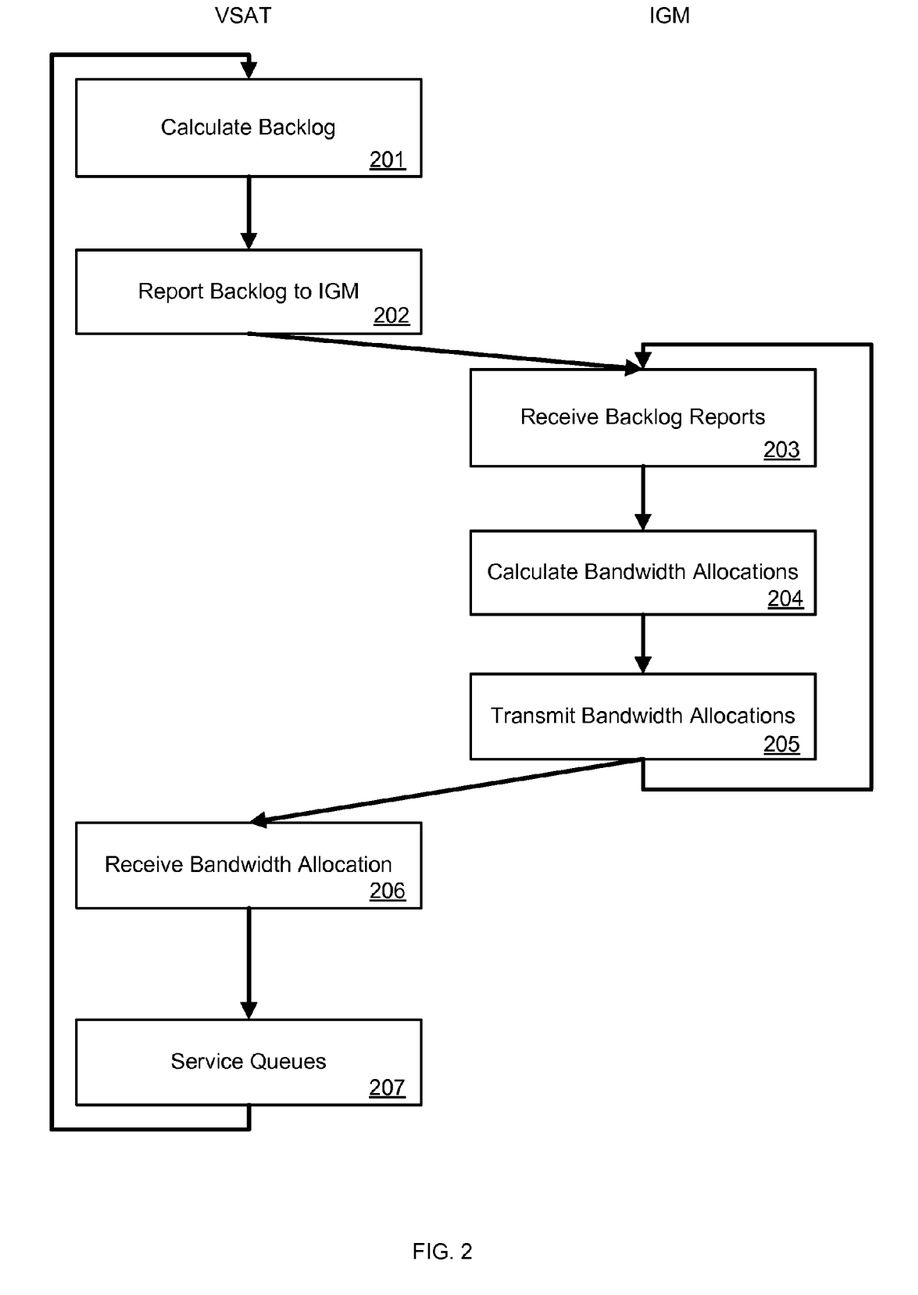
FIG. 2 depicts an exemplary procedure for inroute bandwidth allocation.

FIG. 2 depicts an exemplary procedure for inroute bandwidth allocation. In block 201, a VSAT may calculate a backlog. A VSAT in the VSAT population 102 may calculate a backlog of data waiting to be transmitted to the gateway 101. A separate backlog may be calculated for each priority level of data. The calculation of the backlog may take both link layer and network layer traffic information into account. The backlog may be calculated in bytes. The periods at which the backlog is calculated and reported, or reporting period, may vary. Long reporting periods may result in extra latency at the VSAT, while shorter reporting periods may result in extra overhead. Different VSATs in the VSAT population 102 may calculate backlog asynchronously, and may use different reporting periods. The backlog calculation may include aggregate data for each priority at both layer 2 (L2) and layer 3 (L3) queues.

Figure 3:
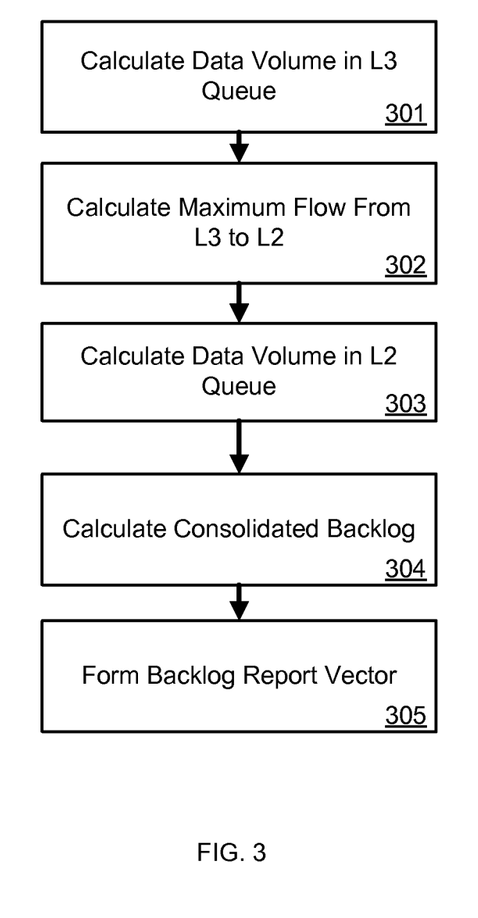
FIG. 3 depicts an exemplary procedure for calculating a backlog at a VSAT.

FIG. 3 depicts an exemplary procedure for calculating a backlog at a VSAT. There may be M classes of data arriving at the VSAT for transmission, and each of the M classes may have multiple flows. For example, TCP data may include four flows at different levels of priority, Conversational, Interactive, Streaming and Bulk, with priorities of 1, 2, 3, and 4, respectively. At L2, there may be one queue with a limited size for each priority class. Data flow from L3 to L2 may be based on the buffer occupancy status at L2. If the buffer at L2 is less full than a threshold amount, data may be dequeued from L3 to L2, otherwise, data may be held at L3.

At L3, there may be three types of sources with in-flow traffic, for example, spoofed TCP flows, IP link layer reliable (IPLR) flows and unspoofed TCP or non-TCP data flows, and each flow may have data at different priority levels, such as, for example, the four TCP priority levels. IPLR may be a protocol for retransmitting IP protocol data units between a VSAT and IP gateway 105 upon detecting packet loss, and may be used for selected flows of transport protocols without a retransmission mechanism, such as UDP and ICMP, where reliable packet delivery may be more important than latency. Data in a spoofed TCP flow may be put into a TCP spoofing queue before being multiplexed in Performance Enhancing Proxy Backbone Protocol (PBP) queue. The TCP spoofing queue may be part of a TCP spoofing kernel (TSK), which may be a transport layer performance enhancing proxy (PEP) as defined by IETF RFC3135. The TCP spoofing queue may be a queue in which data for one TCP flow that is in the process of being performance enhanced may be enqueued prior to transmission via the PBP. PBP may be a protocol between a VSAT and the IP gateway 105 that may reliably deliver packets multiplexed from one or more TCP spoofing queues in the TSK that require the same class of service. There may be multiple TCP flows for a single priority. The spoofed TCP flow may be the only flow with an individual queue. Data from IPLR and unspoofed sources may be directly multiplexed at L3. Each traffic type may include three priority classes. Traffic of different types and from different sources may be multiplexed in L2 priority queues before transmission.

In block 301, data volume in the L3 queues may be calculated. $N_i$ may be the number of flows in the i-th class, $i=1, \ldots, M$. $q_{ij}$ may be the length of the TCP spoofing queue for class i and flow j, $i=1, \ldots, M$, $j=1, \ldots, N_i$.

$$Q_i^{(k=1)} = \sum_{j=1}^{N_i} q_{ij},$$

where k=1, may represent the spoofed traffic. $Q_i^{(k=2)}$ and $Q_i^{(k=3)}$ may be the aggregated queue length of IPLR and unspoofed traffic, respectively, $i=1, \ldots, M$. The spoofed and IPLR traffic may be multiplexed in the PBP queues, one for each priority. $Q_{PBP,i}$ may be the PBP queue size for priority i. For each priority class i, $i=1, \ldots, M$, the data volume, in bits or bytes, at L3 may be calculated according to $$V_{L3}^{(i)} = \sum_{k=1}^{3} Q_i^{(k)} + Q_{PBP,i} = \sum_{j=1}^{N_i} q_{ij} + Q_i^{(2)} + Q_i^{(3)} + Q_{PBP,i}. \quad (1)$$

The total data volume in L3 queues may be calculated according to $$V_{L3} = \sum_{i=1}^{M} V_{L3}^{(i)} = \sum_{i=1}^{M} \left[ \sum_{j=1}^{N_i} q_{ij} + Q_i^{(2)} + Q_i^{(3)} + Q_{PBP,i} \right]. \quad (2)$$

In block 302, a maximum flow from L3 to L2 may be calculated. $X_i$, i=1, ..., M may be a PBP window size for each class of data. $T_0$ may be the backlog reporting period, and an RTT time $T_{RTT}$ may in inroute frames or ms. $R_{plan}$ may be a rate plan in bits/ms or bits/frame. The maximum amount of data that can flow from L3 to L2 for priority i may calculated according to $$A_{L3}^{(i)} = \min[V_{L3}^{(i)}, R_{plan} \cdot T_0, X_i \cdot \text{ceil}(T_0/T_{RTT})]. \quad (3)$$

In block 303, data volume in the L2 queues may be calculated. $V_{L2}^{(i)}$ may be the data amount for class i, i=1, ..., M, in an L2 queue. The total data volume in L2 queues may be calculated according to $$A_{L2} = V_{L2} = \sum_{i=1}^{M} V_{L2}^{(i)}. \quad (4)$$

In block 304, a consolidated backlog may be calculated. $T_a$ may be an average fairness period for resource allocation, and may have a default value of 4 inroute frames, which may be based on the relationship between the duration of an IPOS frame, which may be 45 ms, and the propagation delay from a VSAT to the satellite 103 to the gateway 101. The average fairness period may allow inroute slot allocation to cover more than one frame so that larger burst sizes may be applied. The reported backlog consolidating L2 and L3 traffic and taking into account the rate plan for priority i, i=1, 2, ..., M, may be expressed as $$A_{Report}^{(i)} = \min[V_{L2}^{(i)} + A_{L3}^{(i)}, R_{plan} \cdot T_R], \quad (5)$$

where $T_R \geq \max(T_a, T_0)$ and may be configurable. If there is a sufficient amount of traffic and the reported backlog is governed by $T_R$, $T_a=4$ frames, $T_0$ is set between 8 to 16 frames, and a load balancing period is on the order of 32 frames, it may be reasonable to set $T_R$ between 8 to 16, although $T_0$ can be down to 1 frame. The IGM 113 may assign more than the service rate if there is extra bandwidth.

In block 305, a backlog vector may be formed. The overall backlog report in vector form may be $$A_{Report} = [A_{Report}^{(1)} A_{Report}^{(2)} A_{Report}^{(3)}]. \quad (6)$$

A backlog for conversational traffic may not be calculated, as conversational traffic may be handled separately from interactive, streaming, and bulk traffic.

In block 202, the VSAT may report the backlog to an IGM. For example, after a VSAT in the VSAT population 102 calculates a backlog as in block 201, a backlog report, for example, in the form of $A_{Report}$, may be transmitted to the IGM 113. The VSAT may report the backlog periodically and "as needed", so that when there is a significant change in the backlog, for example, in priority level 1 class data, the VSAT can send a request immediately following the change. The "as needed" reporting may be restricted to priority level 1 class data, and only when the change exceeds, for example, half of the L2 queue limit in the positive direction in the L2 queue.

In block 203, an IGM may receive a backlog report. The calculation of the backlog at the VSAT may be used to make a bandwidth request of the IGM 113. By processing the backlog reports from VSATs in the VSAT population 102, the IGM 113 may be able to grant a VSAT physical layer (PHY) time slots for the transmission of data in a future frame as a result of bandwidth allocation. The backlog reports may be received periodically, or "as needed", due to changes significant changes in a VSATs backlog at priority level 1.

In block 204, an IGM may calculate bandwidth allocations. The IGM 113 may use the VSAT backlog reports, total available bandwidth at the gateway 101, in slots per frame, and predefined priority weights to calculate overall bandwidth allocations for each VSAT in the VSAT population 102. The IGM 113 may maintain virtual queues by en-queuing new backlog reports and de-queuing allocated slots, in order to mimic the VSAT's queuing behaviors. The IGM 113 may calculate a slot allocation for each priority, which may be used to manage the virtual queues of the next frame, as well as the overall allocation of an individual VSAT, which may be broadcast to the VSAT.

Given total available bandwidth, in number of slots/frame, and pre-defined priority weights, the IGM 113 may calculate bandwidth allocation at priority level and then at a VSAT level. A throughput limit for each VSAT based on a nominal service plan rate for each VSAT may be imposed. Fairness control over one or a few periods may be applied to both priority level slot assignment and the throughput limit. Fairness control may impose weight or throughput limits over a period of several frames. Proportional fair scheduling based on the service plan may be used in slot assignment at the VSAT level, with an averaging period of a few frames.

Figure 4:
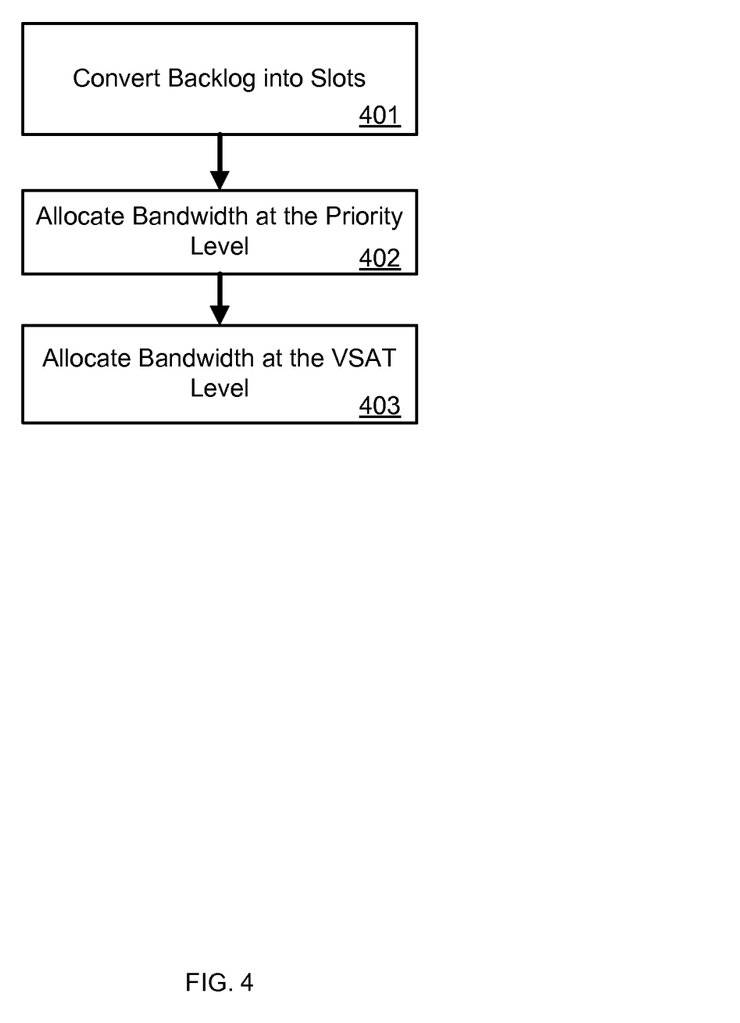
FIG. 4 depicts an exemplary procedure for calculating bandwidth allocation.

FIG. 4 depicts an exemplary procedure for calculating bandwidth allocation. In block 401, the backlog report may be converted into slots. Upon receiving a backlog report from a VSAT, the IGM 113 may perform a conversion on the amount of bandwidth requested in the backlog report from bytes to slots, as the IGM 113 may allocate bandwidth in the form of physical layer slots. The reported backlogs may be converted into slots based on the respective modulation and coding (MODCOD) scheme for a specific VSAT. Both the IGM 113 and the VSAT may know the MODCOD applied at the VSAT.

$T_{RTT}$ may be the round trip time in frame. The IGM 113 may receive a backlog report from a VSAT at time t. The backlog report may be $B_i^{(bits)}(t) = [b_{i1}(t) b_{i2}(t) b_{i3}(t)]$ in bits, i=1, ..., N, where N is the total number of VSATs in the inroute. $M_i$ may be a modulation parameter, in bits per symbol, and $C_i$ may be a coding parameter, for VSAT i. $N_0$ may be a number of symbols in one PHY slot. The total number of slots needed for the reported backlog at time t, in frames, may be calculated as $$B_i^{(slots)}(t) = \text{ceil}\left[\frac{B_i^{(bits)}(t)}{(M_i C_i) N_0}\right]. \quad (7)$$

$B_i(t) = [b_{i1}(t) b_{i2}(t) b_{i3}(t)]$, in slots, may represent the requested slots in the backlog reported at time t. Due to round trip time (RTT) delay, the received backlog $B_i(t)$ at the IGM 113 may actually be the backlog seen by the VSAT at time $t - 0.5 \cdot T_{RTT}$.

In block 402, the bandwidth may be allocated at the priority level. At the priority level, the aggregate backlog traffic may be calculated for each priority. There may be a pre-defined weight associated with each priority, which may reflect the relative importance in assuring the QoS, for example, as measured by latency, for traffic of that priority. For example, a normalized weight [0.5 0.3 0.2] assigned to interactive, streaming and bulk, traffic, may indicate that half of the bandwidth available should go the interactive class given available traffic, even if the traffic mix of the three classes is different from the normalized weights. Similarly, an absolute weight, for example, a weight of 1, may require assigning as much as all if the available bandwidth to that traffic class. Using relative weights among traffic priorities may assure sufficient bandwidth to important traffic classes, while avoiding starvation for lower priority traffic.

Fairness in bandwidth allocation at the priority level may be managed in accordance with the respective weights. Fairness can be per frame or across multiple frames. Fairness across multiple frames may allow the assigning of more bandwidth at a time, resulting in improved latency and possibly less overhead. A fairness period may be L frames, a weight for the highest priority class may be w and the total available bandwidth may be G slots/frame. Fairness across multiple frames allows the assignment of L·w·G slots in one burst, or continuously, given available backlog.

Figure 5:
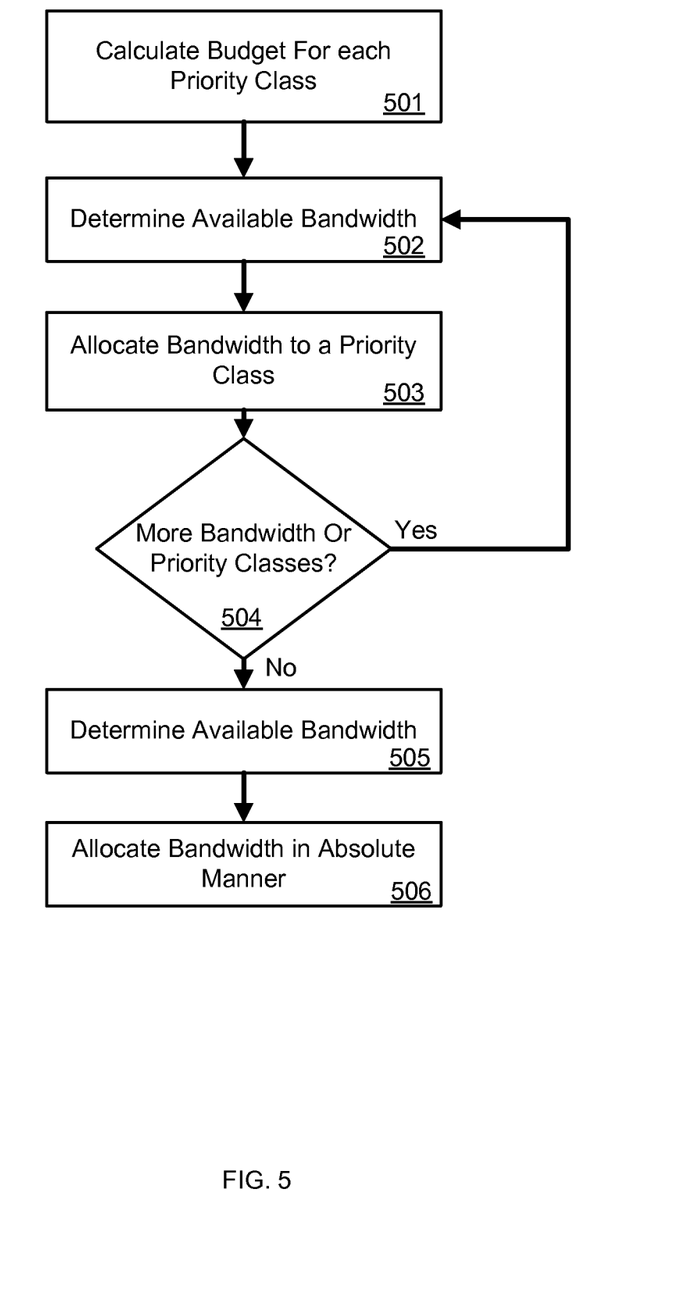
FIG. 5 depicts an exemplary procedure for allocating bandwidth at a priority level.

FIG. 5 depicts an exemplary procedure for allocating bandwidth at a priority level. Bandwidth allocation at the priority level may use two loops running at the IGM 113. The first loop may assign bandwidth based on weights and backlogs. The second loop may assign bandwidth remaining after the first loop from high to low priorities in an absolute manner. If there is still leftover bandwidth after both loops, for example, due to the backlogs not being large, the leftover bandwidth may be equally assigned to each priority as over-allotment.

In block 501, budgets may be calculated for each priority class. For the both loops, t=1, 2, . . . , may be the frame index for the on-going time. Budget(1)=min[round(w1*G), G], Budget(2)=min[round(w2*G), max(0, G-Budget(1)], and Budget(3)=max[0,G-Budget(1)-Budget(2)], where Budget (j), j=1, 2, 3, may be a weight based budget for each priority class at each frame, in slots, and where j=1, 2, 3 may represent interactive, streaming and bulk classes. W=[w1, w2, w3] may be pre-assigned weights for interactive, streaming and bulk classes, respectively. Carryover (t, j), j=1, 2, 3, may be carryover bandwidth at time t. If t=1, Carryover(t,i) may be 0, otherwise if 2≤t<L, $$\text{Carryover}(t, j) = \sum_{k=1}^{t-1} \text{Unused}(k, j).$$

Otherwise, $$\text{Carryover}(t, j) = \sum_{k=t-L}^{t-1} \text{Unused}(k, j).$$

In block 502, the available bandwidth may determined. At any time t, for the first loop, the loop may first check the amount of bandwidth available. If the first loop is assigning bandwidth to interactive traffic, j=1, and Available BW_Loop1(1,j)=G, where Available BW_Loop1(i, j) may be available bandwidth in the first loop. This may indicate that all of the total bandwidth is currently available. If j=2, indicating streaming traffic, Available_BW_Loop1(1,j)=max[0, G-Allocation_BW_Loop1(1,1)]. The amount of bandwidth available in the first loop may be the amount left after previous bandwidth allocations by the first loop to interactive traffic, or, if that amount is negative, 0. If j=3, indicating the first loop is assigning bandwidth to bulk traffic, Available_BW_Loop1(1,j)=max[0,G-Allocation_BW_Loop1(1,1)-Allocation_BW_Loop1(1,2)]. The amount of bandwidth available in the first loop may be the amount left after previous bandwidth allocations by the first loop to interactive traffic and streaming traffic, or, if that amount is negative, 0.

In block 503, bandwidth may be allocated to a priority class. After determining how much bandwidth is available, the first loop may allocate bandwidth to a traffic class. Max (i,j) may be the maximum allocation at time t, Max(1,j)=Carryover(t,j)+Budget(1,j). Allocation_BW_Loop1(1,j)=min [Backlog(1,j), Max(i,j), Available_BW_Loop1(1,j)], where Allocation_BW_Loop(1,j) may be the allocated bandwidth in Loop 1, in slots, and Backlog(1,j) may be the aggregate traffic load in each priority class, in slots, for example, as received by the IGM 113 in the backlog reports. The first loop may allocate to the priority class j whichever amount of bandwidth is smaller, the backlog amount of the priority class, the carryover plus the budgeted amount for the priority class, or the remaining available bandwidth.

After a bandwidth allocation has been calculated by the first loop for the priority class j, the first loop may determine if there are any unused resources. Unused(t,j)=Budget(1,j)-Allocation_BW_Loop1(1,j), where Unused(t,j) may be the unused resources at time t. If a priority class is allocated less bandwidth then was budgeted for that priority class, the difference may be considered to be unused bandwidth.

The first loop may then determine how much backlog remains for a priority class j, based on the bandwidth allocation. BL_remaining_Loop1(1,j)=Backlog(1,j)-Allocation_BW_Loop1(1,j), where BL_remaining_Loop1(i,j) may be the remaining backlog for priority class j, which may be equal to the total backlog for priority class j minus the amount of bandwidth that has been allocated to priority class j by the first loop.

In block 504, whether there is any remaining bandwidth or are any priority classes left that have not been assigned bandwidth may be determined. The first loop may run for all available priority classes, for example, priority class j, j=1, 2, 3, while there is bandwidth remaining, looping back to block 502. After the first loop has finished allocating bandwidth to all of the priority classes or run out of bandwidth, a second loop allocate the remaining bandwidth among the priority classes, as in block 505.

In block 505, the amount of available bandwidth may be determined. The second loop may determine how much bandwidth is available. If j=1, indicating interactive traffic, Available_BW_Loop2(1,j)=Available_BW_Loop1(1,3)-Allocation_BW_Loop1(1,3), where Available_BW_Loop2(i,j) may be the amount of bandwidth available to priority class j in the second loop. The amount of bandwidth available to interactive traffic in the second loop may be the amount of bandwidth that was available for allocation to bulk traffic in the first loop minus the amount of bandwidth the first loop allocated to bulk traffic. If j=2, indicating streaming traffic, Available_BW_Loop2(1,j)=Available_BW_Loop2(1,1)-Allocation_BW_Loop2(1,1). The bandwidth available for streaming traffic in the second loop may be the amount of bandwidth that was available to interactive traffic minus the amount of bandwidth the second loop allocated to interactive traffic. If j=3, indicating bulk traffic Available_BW_Loop2(1,j)=Available_BW_Loop2(1,2)-Allocation_BW_Loop2(1,2). The amount of bandwidth available to bulk traffic may be the amount of bandwidth that was available to streaming traffic in the second loop minus the amount of bandwidth allocated to streaming traffic by the second loop.

In block 506, bandwidth may be allocated to all priority classes in an absolute manner, from high priority to low priority. After determining the amount of bandwidth available, the second loop may allocate bandwidth to the different priority classes. For each priority class j, Allocation_BW_Loop2(1,j)=Min[BL_remaining_Loop1(1,j), Available_BW_Loop2(1,j)]. A priority class may be allocated whichever amount is smaller, the amount of backlog that was leftover after the first loop, BL_remaining_Loop1(1,j), or the amount of bandwidth that was available to be assigned to that priority class as determined by the second loop. That is, if the leftover backlog for a priority class is less than the total amount of bandwidth available, the priority class may be assigned enough bandwidth to take care of the backlog. After allocating bandwidth to a priority class, the second loop may update the remaining backlog for that priority class. BL_remaining_Loop2(1,j)=BL_remaining_Loop1(1,j)−Allocation_BW_Loop2(1,j). The remaining backlog for a priority class may be reduced by the amount of bandwidth allocated to the priority class by the second loop.

After the first and second loops have allocated bandwidth, there may still be leftover bandwidth. The leftover bandwidth may be used for ALOHA channels or further distributed as a TDM resource to the priority classes, for example, by simple Round Robin, by evenly dividing the bandwidth among the priority classes. Leftover=G−sum(Allocation_BW_Loop1 (1,j)+Allocation_BW_Loop2(1,j)), j=1, 2, 3. The leftover bandwidth may be the total bandwidth minus the bandwidth assigned by both the first loop and the second loop to all of the available priority classes.

If the leftover is for TDM, the allocated bandwidth for each priority class may be determined according to Bandwidth Allocation for Priority j=Allocation_BW_Loop1 (1,j)+Allocation_BW_Loop2(1,j)+⅓*Leftover, assigning each priority class an even portion of the leftover bandwidth.

In block 403, bandwidth may be allocated at the VSAT level. Bandwidth allocation at the VSAT level may assign bandwidth with a specific amount of slots for each priority type to a VSAT. The bandwidth allocations may specify the number of slots to be used in de-queuing a link layer priority queue at the VSAT. To mimic the link layer queues at the VSAT, the IGM 113 may manage timely updated virtual queues. The IGM 113 may control the maximum throughput of a VSAT according to the VSATs' respective service plan. In case of congestion, the IGM 113 may regulate the throughput from the VSATs proportional to the VSATs' service plans.

The IGM 112 may use proportional fair scheduling to allocate bandwidth. A service plan for the i-th VSAT may be $A_i$ and the base plan may be $A_0$ in slots per frame, i=1, 2, .... The plan ratio may be $A_i/A_0$. The average throughput for i-th VSAT may be $S_i$ and the instant assignment may be $R_i$, in slots per frame. The exponential moving average (EMA) for the throughput at time t may be expressed as $$S_i(t) = \alpha \cdot R_i + (1-\alpha) \cdot S_i(t-1) \quad (8)$$

where $\alpha$ may be a smoothing factor determining the filter equivalent time constant. If the scheduling period is T, then the time constant $\tau$ of EMA may be $$\frac{T}{\ln(1-\alpha)}.$$

$\alpha$=0.22 may be equivalent to time constant $\tau \approx 4$ when T=1 frame.

A throughput vector may be $S(t)=[S_1(t),S_2(t), \ldots, S_N(t)]$, and an allocation rate vector may be $R(t)=[R_1(t), R_2(t), \ldots, R_N(t)]$, where N is the number of VSATs. A scheduler, for example, the IGM 113, may sort the ratio, $S_i/A_i$, at every frame t, and assign the slots of the frame to a VSAT with the smallest ratio. If there are any slots left, the slots may then be assigned to the VSAT with second smallest ratio, and so on, the greedy filling continuing if necessary. Once the slots are assigned, the scheduler may update the above average throughputs formula as in equation (8).

The service plan may be converted from bits/frame to slot/frame based on reported MODCOD of the individual VSAT or nominal MODCOD.

Figure 6:
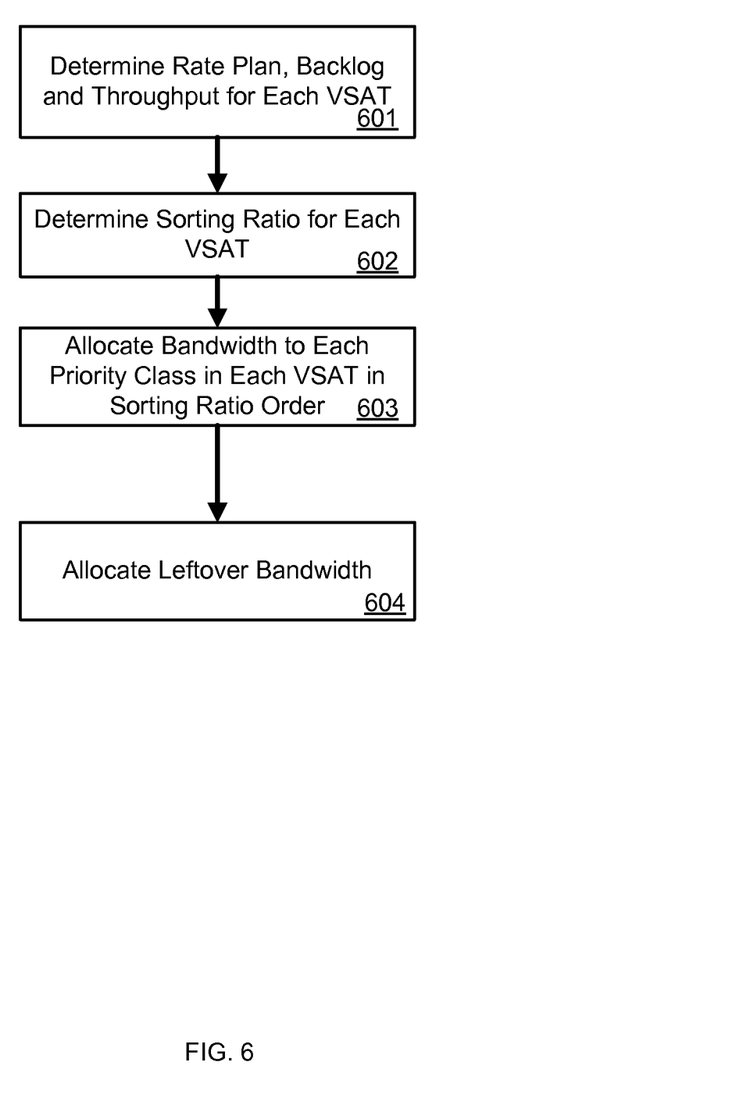
FIG. 6 depicts an exemplary procedure for allocating bandwidth at a VSAT level.

FIG. 6 depicts an exemplary procedure for allocating bandwidth at a VSAT level. In block 601, a rate plan, backlog, and throughput may be determined for each VSAT. Each VSAT serviced by the gateway 101 may be identified by a user ID and an associated plan rate, Plan_rate_terminal(i), i=1, ... N, where i may be the VSAT and N may be the total number of VSATs. The frame index for ongoing time may be t. For all of the VSATs i=1, ... , N, Budget_Terminal(i)=Plan_rate_terminal(i), where Budget_Terminal(i) may be the budget for a VSAT, and may be set equal to the VSATs plan rate. If this is the first frame, t=1, then Carryover_Terminal (t,i)=0 for all VSATs, where Carryover_Terminal(t,i) may be the number of carryover slots for all traffic of terminal i at time t. Otherwise, if this is not the first frame, If 2≤t<K, where K is the period for throughput limitations, and may be, for example, 4, then $$\text{Carryover\_Terminal}(t, i) = \sum_{k=1}^{t-1} \text{Unused\_Terminal}(k, i).$$

The carryover slots for a VSAT may be the may be the total number of unused slots for the VSAT from the previous t−1 frames. If t≥K, then $$\text{Carryover\_Terminal}(t, i) = \sum_{k=t-K}^{t-1} \text{Unused\_Terminal}(k, i).$$

The carryover slots for a VSAT may be the total number of unused slots for the VSAT from the previous K frames.

The IGM 113 may determine the exponential moving average (EMA) for overall throughput for each of the VSATs. If this is the first frame, t=1, then EMA_throughput(t,i)=0, where EMA_throughput(t,i) is the exponential moving average for overall throughput for VSAT i and time t. In this first frame, all VSATs may have an EMA for throughput of 0. In subsequent frames, EMA_throughput(t,i)=a*Allocation_BW_Terminal(t−1,i)+(1−a)*EMA_throughput(t−1,i), where a is a factor with default value of 0.22, and may be between 0.2 to 0.25. The EMA throughput of a VSAT in the current frame may be a function of the amount of bandwidth allocated to the VSAT by the IGM 113 in the previous frame and the EMA throughput of the VSAT in the previous frame.

At any time t, the IGM 113 may update the virtual queues for each priority class of every VSAT. The IGM 113 may need to update virtual queues to mirror the priority queues at the VSATs. A VSAT may report its backlog at a period smaller, equal or larger than the RTT time. Because of the nontrivial RTT in the link between the satellite 103, the VSAT population 102, and the gateway 101, to avoid multiple booking or over allotment, the RTT may be taken into account when doing bandwidth allocation. After a VSAT reports its backlog, it will take one RTT time for the VSAT to receive the granted bandwidth allocation from the IGM 113. Thus in assessing the backlog in the virtual queue at the IGM 113, it may be necessary to subtract the allocated bandwidth in the most recent RTT.

At the beginning of a frame t, if the IGM 113 receives a backlog report from a VSAT, Virtual Queue Size of Priority j (t) (j=1, 2, 3)=max [0, newly reported backlog for priority j−sum (allocation for priority j in the most recent RTT of this terminal)]. The size of the virtual queue at the IGM 113 for each priority class may be set to whichever is larger, 0, or the newly reported backlog for that priority class from the VSAT minus the bandwidth allocation from the IGM 113 to the VSAT in the most recently sent bandwidth allocation. If the IGM 113 doesn't receive a backlog report from the VSAT at the start of frame, t, then Virtual Queue Size of Priority j (t)=Virtual Queue Size of Priority j (t−1), the size of the virtual queue remains the same as it was in the previous frame. In this way, the IGM 113 may manage virtual queues that mirror the priority queues at the VSATs.

For example, for interactive, streaming, and bulk priority classes, if the IGM 113 receives the backlog report from a terminal at time t, Backlog_$VQ\_intv(t,i)$=max[0,Reported_Backlog_ $intv(t,i)$−sum(Allocation_$BW\_intv(t,i)$ in the most recent $RTT$)], Backlog_$VQ\_stream(t,i)$=max[0,Reported_Backlog_stream$(t,i)$−sum(Allocation_$BW\_stream(t,i)$ in the mote recent $RTT$)], and Backlog_$VQ\_bulk(t,i)$=max[0,Reported_Backlog_ bulk$(t,i)$−sum(Allocation_$BW\_bulk(t,i)$ in the most recent $RTT$)], where Backlog_VQ_intv(t,i), Backlog_VQ_stream(t,i), and Backlog_VQ_bulk(t,i) may be the backlog in the virtual queue for the interactive, streaming, and bulk priority classes, respectively, at terminal i and time t. The backlogs in the virtual queue for each priority class may be updated to reflect the reported backlog minus the bandwidth most recently allocated to the backlog.

If the IGM 113 doesn't receive a backlog report, then

Backlog_$VQ\_intv(t,i)$=Backlog_$VQ\_intv(t−1,i)$,

Backlog_$VQ\_stream(t,i)$=Backlog_$VQ\_stream(t−1,i)$;

Backlog_$VQ\_bulk(t,i)$=Backlog_$VQ\_bulk(t−1,i)$.

The backlogs in the virtual queues in the current frame are assumed to be equal to the backlogs in the virtual queues in the previous frame.

In block 602, a sorting ratio may be determined for the VSATs. The IGM 113 may, after updating the virtual queues, calculate the aggregate amount of traffic for each priority for all of the terminals and calculate the bandwidth allocation at the priority level, as described in block 402. Then IGM 113 may calculate Max_Terminal(t,i)=Carryover_Terminal (t,i)+Budget_Terminal(i), i=1, . . . , N, where Max_Terminal(t,i) may be the maximum bandwidth allocation allowable for all traffic from VSAT i at time t. The maximum allocation for a VSAT may be the sum of the carryover for the VSAT and the budget for the VSAT, based on the VSATs plan rates. A ratio of the EMA throughput of the VSAT i at time t to the VSATs plan rate may be calculated as Ratio(t,i)=EMA_throughput (t,i)/Plan_rate_terminal(i), i=1, . . . , N. Once the Ratio has been calculated for every VSAT i at time t, the VSATs may be sorted in Ratio(t,i) in ascending order, which may result in a new index for the VSATs, j=1, . . . , N. The VSAT for which j=1 may have the smallest Ratio.

In block 603, bandwidth may be allocated to each priority class at each of the VSATs in order of sort ratio. Bandwidth may then be allocated based on the sorted list Ratio(t,j), which may allow a VSAT to hold up to the whole frame of the inroute. The sorted list Ratio(t,j) may apply to each priority class. For interactive traffic, the bandwidth available for interactive traffic across all terminals, Available_BW_intv, may be obtained from the priority level bandwidth allocation for interactive traffic, Available_BW(1,1), as in block 402. Available_BW(1,1) may be the sum of the bandwidth allocated for interactive traffic by the first loop, the second loop, and any assigned portion of the leftover bandwidth. The IGM 113 may set Available_BW_intv=Available_BW(1,1).

For every VSAT j in the sorting list Ratio(t,j), if there is bandwidth available for interactive traffic, for example, all of the bandwidth has not been assigned to VSATs earlier in the sorting list Ratio(t,j), then Max_intv(t,j)=Max_Terminal(t,j), where Max_intv(t,j) may be maximum allocation for interactive traffic for VSAT j at time t, and Allocation_BW_intv(t,j)=min [Max_intv(t,j), Backlog_VQ_intv(t,j)], where Allocation_BW_intv(t,j) may be the bandwidth allocation for interactive traffic at VSAT j at time t. Interactive traffic at VSAT j may be allocated whichever amount of bandwidth is smaller, the maximum amount the VSAT is allowed to be allocated, or the amount needed to take care of the backlog in the interactive queue at the VSAT, as represented by the virtual queue at the IGM 113. If there is a minimum burst size, for example, three slots, it may be applied here. After allocating bandwidth to each VSAT j, the amount of available bandwidth for interactive traffic may be updated by subtracting the just allocated amount. If all of the bandwidth for interactive traffic is used before all the VSATs have been allocated bandwidth, the remaining VSATs may be allocated zero bandwidth for interactive traffic.

Once the IGM 113 has allocated bandwidth to all of the VSATs for interactive traffic, a residual bandwidth may be calculated, Residual_BW_intv=Available_BW(1,1)−sum (Allocation_BW_intv(t,i)). The residual bandwidth may be bandwidth that was allocated to interactive traffic, for example, in block 402, but was not allocated to any specific VSAT for use to transmit interactive traffic. This may occur when, for example, there are very small backlogs of interactive traffic at the VSATs. This residual bandwidth may be added to the bandwidth allocated for streaming traffic, Available_BW_stream=Available_BW(1,2)+Residual_BW_intv, where Available_BW(1,2), may be obtained from the priority level bandwidth allocation for streaming traffic as in block 402. Available_BW(1,2) may be the sum of the bandwidth allocated for streaming traffic by the first loop, the second loop, and any assigned portion of the leftover bandwidth.

For every VSAT j in the sorting list Ratio(t,j), if there is bandwidth available for streaming traffic, for example, all of the bandwidth has not been assigned to VSATs earlier in the sorting list Ratio(t,j), then Max_stream(t,j)=max[0, Max_Terminal(t,j)−Allocation_BW_intv(t,j)]. The maximum amount of bandwidth that may be allocated for streaming traffic to VSAT j at time t, Max_stream(t,j), may be whichever is larger, 0, or the maximum allowed bandwidth allocation for the VSAT minus the bandwidth that has already been allocated to the VSAT j for interactive traffic. Bandwidth may then be allocated to the VSAT according to Allocation_BW_stream(t,j)=min [Max_stream(t,j), Backlog_

VQ_stream(t,j)], where Backlog_VQ_stream(t,j) may be the backlog in the virtual queue for streaming traffic for the VSAT j as maintained at the IGM 113. The amount of bandwidth assigned to the VSAT j for streaming traffic may be whichever is smaller, the maximum allowed streaming bandwidth allocation for the VSAT j, or the amount of bandwidth needed to take care of the backlog of streaming traffic for the VSAT j. If there is a minimum burst size, for example, three slots, it may be applied here. After allocating bandwidth to each VSAT j, the amount of available bandwidth for streaming traffic may be updated by subtracting the just allocated amount. If all of the bandwidth for streaming traffic is used before all the VSATs have been allocated bandwidth, the remaining VSATs may be allocated zero bandwidth for streaming traffic.

Once the IGM 113 has allocated bandwidth to all of the VSATs for streaming traffic, a residual bandwidth may be calculated, Residual_BW_stream=Available_BW_stream−sum(Allocation_BW_stream(t,i)). The residual bandwidth may be bandwidth that was allocated to streaming traffic, for example, the streaming traffic allocation from block 402 and the bandwidth leftover after allocating interactive traffic bandwidth to the VSATs, and was not allocated to any specific VSAT for use to transmit streaming traffic. This may occur when, for example, there are very small backlogs of streaming traffic at the VSATs. This residual bandwidth may be added to the bandwidth allocated for bulk traffic, Available_BW_bulk=Available_BW(1,3)+Residual_BW_stream, where Available_BW(1,3), may be obtained from the priority level bandwidth allocation for bulk traffic as in block 402. Available_BW(1,3) may be the sum of the bandwidth allocated for bulk traffic by the first loop, the second loop, and any assigned portion of the leftover bandwidth.

For every VSAT j in the sorting list Ratio(t,j), if there is bandwidth available for bulk traffic, for example, all of the bandwidth has not been assigned to VSATs earlier in the sorting list Ratio(t,j), then Max_bulk(t,j)=max[0, Max_Terminal(t,j)−Allocation_BW_intv(t,j)−Allocation_BW_stream(t,j)]. The maximum amount of bandwidth that may be allocated for bulk traffic to VSAT j at time t, Max_bulk(t,j), may be whichever is larger, 0, or the maximum allowed bandwidth allocation for the VSAT minus the bandwidth that has already been allocated to the VSAT j for interactive traffic and streaming traffic. Bandwidth may then be allocated to the VSAT according to Allocation_BW_bulk(t,j)=min [Max_bulk(t,j), Backlog_VQ_bulk(t,j)], where Backlog_VQ_bulk(t,j) may be the backlog in the virtual queue for bulk traffic for the VSAT j as maintained at the IGM 113. The amount of bandwidth assigned to the VSAT j for bulk traffic may be whichever is smaller, the maximum allowed bulk bandwidth allocation for the VSAT j, or the amount of bandwidth needed to take care of the backlog of bulk traffic for the VSAT j. If there is a minimum burst size, for example, three slots, it may be applied here. After allocating bandwidth to each VSAT j, the amount of available bandwidth for bulk traffic may be updated by subtracting the just allocated amount. If all of the bandwidth for bulk traffic is used before all the VSATs have been allocated bandwidth, the remaining VSATs may be allocated zero bandwidth for bulk traffic. Any VSAT that is not scheduled may also be assigned zero bandwidth allocation for the corresponding classes.

The total bandwidth allocated to each VSAT by the IGM may be calculated as Allocation_BW_Terminal(t,i)=Allocation_BW_intv(t,i)+Allocation_BW_stream(t,i)+Allocation_BW_bulk(t,i), i=1, . . . , N. The bandwidth allocated to a VSAT i at time t may be the sum of the interactive bandwidth, streaming bandwidth, and bulk bandwidth allocation to the VSAT i at time t. The total bandwidth allocation may be used to determine if there are any unused resources, Unused_Terminal(t,i)=Budget_Terminal(i)−Allocation_BW_Terminal(t,i), i=1, . . . , N, where Unused_Terminal(t,i) may be the unused resource by VSAT i at time t. The unused resources may be the difference between the amount of bandwidth that was budgeted for a VSAT and the amount of bandwidth that was actually allocated to the VSAT.

The virtual queues maintained by the IGM 113 for each VSAT may be updated using the bandwidth allocations. Each VSAT may have a virtual queue at the IGM 113 for each priority class available, for example, for the interactive, streaming, and bulk priority classes. The IGM 113 may update the virtual queues according to Backlog_VQ_intv(t,i)=max[0,Backlog_VQ_intv(t,i)−Allocation_BW_intv(t,i)], i=1, . . . , N, Backlog_VQ_stream(t,i)=max[0,Backlog_VQ_stream(t,i)−Allocation_BW_stream(t,i)], i=1, . . . , N, and Backlog_VQ_bulk(t,i)=max[0,Backlog_VQ_bulk(t,i)−Allocation_BW_bulk(t,i)], i=1, . . . , N.

For every VSAT i, the interactive, streaming, and bulk virtual queue backlogs may be reduced by the amount of bandwidth just allocated to that VSAT for interactive, streaming, and bulk traffic, respectively.

In block 604, leftover bandwidth may be allocated. The IGM 113 may determine if there is any bandwidth leftover after bandwidth has been allocated to all of the VSATs. At the end of terminal level bandwidth allocation by the IGM 113, there may be leftover bandwidth that is not assigned due to zero backlog in the virtual queues, or terminal throughput limitations. Leftover_BW=G−sum(Allocation_BW_Terminals(t,i)), i=1, . . . , N, where Leftover_BW may be the leftover bandwidth, in slots. The leftover bandwidth may be the difference between the total amount of bandwidth available at the gateway 101, and the bandwidth that the IGM 113 has already allocated to the VSATs. If there is no leftover bandwidth, Leftover_BW==0, then the bandwidth allocation may end. Otherwise, if there is leftover bandwidth, Leftover_BW>0, the IGM 113 may allocate the leftover bandwidth to the VSATs.

To allocate the leftover bandwidth, the IGM 113 may first determine how much leftover backlog is in the virtual queues for the VSATs.

Leftover_VQ=Sum(Backlog_VQ_intv(t,i)+Backlog_VQ_stream(t,i)+Backlog_VQ_bulk(t,i)), i=1, . . . , N. Leftover_VQ may be the total of all backlogs in the virtual queues across all traffic classes and VSATs. If there is no leftover backlog, Leftover_VQ==0, then, because backlog reporting allows a VSAT to report a sufficient amount of backlog at both L2 and L3, and streaming and bulk traffic are less sensitive to delay, the leftover bandwidth, Leftover_BW, may be allocated to other uses, such as Aloha channels. Otherwise, if there is leftover backlog in the virtual queues, Leftover_VQ>0, the IGM 113 may proceed to allocate the leftover bandwidth to the VSATs. If the leftover bandwidth is due to terminal throughput restrictions, and there is leftover backlog in the virtual queues, throughput limits may be temporarily broken to allow for full utilization of the spectrum.

The IGM 113 may assign the leftover bandwidth, Leftover_BW, from high to low priorities across the VSATs until either the leftover bandwidth or leftover backlog runs out. The allocated bandwidth for a priority class may be limited by the L2 queue for the VSAT. If there is a minimum burst size, such as, for example, three slots, it may be applied. If the leftover backlog runs out before the leftover bandwidth, and remaining leftover bandwidth may be allocated to Aloha. Once either the leftover bandwidth has all been allocated, or the leftover backlog has run out, the bandwidth allocations for the VSATs may be updated both for each priority class and overall. Allocation_BW_intv(t,i), Allocation_BW_stream(t,i), Allocation_BW_bulk(t,i) for each VSAT i may be incremented by the amount of leftover bandwidth assigned to the respective priority classes for the VSAT i, and Allocation_BW_Terminal(t,i), may be incremented to reflect the overall increase in allocated bandwidth across all priority classes for the VSAT i. The IGM 113 may also update the virtual queues, subtracting the allocated leftover bandwidth for each VSAT and priority class from the virtual queues for the priority classes across all of the VSATs.

The IGM 113 may also impose throughput restrictions on the VSATs. A plan rate in terms of Megabits per second may be equivalent to $R_{max}(k)$ slots/frame for user plan k, k=1, 2, 3. The throughput limitations may be managed in every frame or every few frames, depending on the fairness period. A limiting period may be set to M frames with a default value of M=4. Fairness may be managed similar to the management of weighted bandwidth.

In block 205, the IGM 113 may transmit the bandwidth allocations to the VSATs. For example, after calculating bandwidth allocations for the VSATs in the VSAT population 102, as in FIG. 4, the IGM 113 may transmit the bandwidth allocations to the VSATs through the satellite 103.

In block 206, the VSATs may receive the bandwidth allocation from the IGM 113. The bandwidth allocation received by the VSATs may include an overall allocation for each VSAT, given in, for example, slots. While the IGM 113 may allocate bandwidth for each priority of every VSAT for a future frame, for better spectrum utilization of the downlink, the IGM 113 may only generate an overall bandwidth allocation for each VSAT. The overall bandwidth allocation may be broadcast by the gateway 101 and received by the VSATs after, for example, half of a RTT time.

In block 207, the VSATs may perform queue servicing using the bandwidth allocations received from the IGM 113. The VSATs may use the bandwidth allocated by the IGM 113 to service their priority queues, transmitting traffic of different priority classes to the gateway 101 through the satellite 103 based on the bandwidth allocations for each type of traffic. Upon receiving the bandwidth allocation command, the backlog scenario at the VSAT may vary due to traffic dynamics. Assuming that the channel condition as well as the modulation and coding scheme at the VSAT persists, the VSAT may apply the bandwidth allocation to the current backlog based on the same priority weights applied at the IGM 113, which may allow the high priority traffic to take over some bandwidth that was to be used by lower priority traffic if the high priority has an increased backlog. This may result in improved latency performance for high priority classes, at the cost of violating the IGM 113 bandwidth allocation. The IGM 113 may self-correct in follow-on bandwidth allocations by reading new backlog reports from the VSAT.

At a frame t, the allocated slots for the VSAT from the IGM 113 may be C(t). The number of information bits per slot may be $b_0$. $W_i$ may be the weight and $V_{L2}^{(i)}(t)$ may be the updated queue length for traffic class i, respectively, i=1, ..., M. M may be the number of priorities with an exemplary value of 3, for example, for the interactive, streaming, and bulk traffic classes.

At L2, the VSAT may service the priority queues for interactive traffic by allocating slots according to $S_1(t)=\min[V_{L2}^{(1)}(t)/b_0, W_1 \cdot C(t)]$, where $S_1(t)$ may be the number of slots allocated by the VSAT to interactive traffic. The number of slots allocated to interactive traffic may be the lesser of the number of slots required to empty the priority queue of all interactive traffic, and the maximum proportion of the total available slots interactive traffic may be assigned according to the weighting.

The VSAT may service the priority queues for streaming traffic by allocating slots according to $S_2(t)=\min[V_{L2}^{(2)}(t)/b_0, W_2 \cdot C(t)]$, where $S_2(t)$ may be the number of slots allocated by the VSAT to streaming traffic. The number of slots allocated to streaming traffic may be the lesser of the number of slots required to empty the priority queue of all streaming traffic, and the maximum proportion of the total available slots streaming traffic may be assigned according to the weighting.

The VSAT may service the priority queues for bulk traffic by allocating slots according to $S_3(t)=\min[V_{L2}^{(3)}(t)/b_0, W_3 \cdot C(t)]$, where $S_3(t)$ may be the number of slots allocated by the VSAT to bulk traffic. The number of slots allocated to bulk traffic may be the lesser of the number of slots required to empty the priority queue of all bulk traffic, and the maximum proportion of the total available slots bulk traffic may be assigned according to the weighting.

$\Delta S(t)$ may be the difference between the total number of slots in the bandwidth allocated to the VSAT by the IGM 113 and the sum of the slots granted by the VSAT to interactive, streaming, and bulk traffic. If $\Delta S(t)$ is greater than 0, $\Delta S(t)=C(t)-S_1(t)-S_2(t)-S_3(t)>0$, there may be still be slots available to be allocated by the VSAT. The VSAT may allocate the $\Delta S(t)$ slots across the available priorities of traffic in an absolute manner until all of the slots are used or there is no more traffic in the L2 priority queues.

After receiving the allocated bandwidth from the IGM 113, and allocating the bandwidth among the L2 queues, the VSAT may de-queue L2 packets to PHY for transmission to the satellite 103. The L2 buffers may be designed with limited sizes, but may have a sufficient amount of data for L2 transmission without requiring data to be pulled from the L3 queues before transmission. After the data has been de-queued from the L2 queues, the VSAT may perform network layer queue servicing for the L3 queues, pulling data into the L2 queues from the L3 queues.

The amount of data pulled from L3 to L2 may depend on the available occupancy at L2. Whenever L2 de-queuing is finished, the difference between the queue limit and the existing queue length in the L2 queues may be calculated, which may determine how much data may be pulled into the L2 queues from the L3 queues.

L2 may have buffer limits for each priority queue. The queue size may be configurable and determined based on the plan rate or inroute capacity. Whenever the queue length is smaller than a threshold, the data in L3 queues may flow from L3 to L2. Such queuing operations may be continuous and may be independent of L2 queue servicing.

There may be M priority classes, for example 3 priority classes, interactive, streaming, and bulk, and multiple flows in each class. The number of information bits per slot may be $b_0$, and may be based on current MODCOD settings. $V_{L2,max}^{(i)}$ and $V_{L2}^{(i)}$ may be the buffer limit and instant queue length at time t for class i, respectively, i=1, ..., M.

The L2 queue size limit may be determined based on the plan rate and the fairness period applied in both the IGM 113 and the VSAT. A reasonable queue size at L2 may benefit the PBP operation. The fairness period may be K frames, which may be 4 by default. The plan rate may be $R_{plan}$ in bit/frame. The buffer size for each priority can be may be $$V_{L2,max}^{(i)} = a \cdot K \cdot R_{plan}, \ a \geq 1, i=1, \ldots, M. \tag{9}$$

The default value for a may be 2, which may allow the IGM 113 to allocate extra bandwidth when the plan limit is reached. The L2 queue limit may be rounded to be expressed in units of L2 packets.

$U_i(t)$, in bits or bytes, i=1, ..., M, may be the amount of data moving from L3 to L2 at a given time t. The VSAT may service the L3 queues by, for interactive traffic, having the flowing amount of data be $U_1(t)=\min[V_{L3}^{(1)}(t), V_{L2,max}^{(1)}(t-1)]$, subject to a PBP window size for interactive traffic. The updated queue length for class 1, interactive traffic, may be $V_{L2}^{(1)}(t)=V_{L2}^{(1)}(t-1)+U_1(t)$.

For streaming traffic, the flowing amount of data may be $U_2(t)=\min[V_{L3}^{(2)}(t), V_{L2,max}^{(2)}-V_{L2}^{(2)}(t-1)]$, subject to a PBP window size for streaming traffic. The updated queue length for class 2, streaming traffic, may be $V_{L2}^{(2)}(t)=V_{L2}^{(2)}(t-1)+U_2(t)$.

For bulk traffic, the flowing amount of data may be $U_3(t)=\min[V_{L3}^{(3)}(t), V_{L2,max}^{(3)}-V_{L2}^{(3)}(t-1)]$, subject to a PBP window size for bulk traffic. The updated queue length for bulk traffic may be $V_{L2}^{(3)}(t)=V_{L2}^{(3)}(t-1)+U_3(t)$.

Fulfilling $U_i(t)$, i=1, ..., M, from L3 to L2 may follow a Round Robin equal-data scheme if there are multiple flows. Because the data from L3 to L2 may either be from PBP queues, which may be from multiplexed spoofed and IPLR traffic, or from multiplexing queues of unspoofed traffic, weights based on the flow numbers may be applied in dequeuing PBP or unspoofed queues.

For example, at the highest priority level, for example, level 1 for interactive traffic, there may be $m_1$ and $k_1$ spoofed, including IPLR, and unspoofed flows, respectively, the dequeuing amount may be $$\frac{m_1}{m_1+k_1} \cdot U_1(t)$$

for PBP-1 queue and $$\frac{k_1}{m_1+k_1} \cdot U_1(t)$$

for the unspoofed multiplexing queue of priority 1.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wire line varieties thereof, and/or any other computerized device capable of configuration for receiving, storing and/or processing data for standalone application and/or over a networked medium or media. Examples of communication media that can be employed include, without limitation, wireless data networks, wire line networks, and/or a variety of networked media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media.

In general, computer-readable media may include any medium capable of being a carrier for an electronic signal representative of data stored, communicated or processed in accordance with embodiments of the present invention. Where applicable, method steps described herein may be embodied or executed as instructions stored on a computer-readable medium or media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the following claims.

What is claimed is:

1. A method for inroute bandwidth allocation supporting multiple traffic priorities in a satellite network comprising:
    generating a backlog report;
    transmitting the backlog report to an inroute group manager;
    receiving a bandwidth allocation from the inroute group manager; and
    servicing priority queues and transmitting data to a satellite based on the bandwidth allocation from the inroute group manager, wherein servicing the priority queues comprises:

allocating bandwidth from the bandwidth allocation to a plurality of level 2 queues based on a backlog of the level 2 queues and a weight for each of the level 2 queues;
transmitting data from the level 2 queues to the satellite according to the bandwidth allocated to each of the level 2 queues;
determining an occupancy rate of the plurality of level 2 queues;
calculating an amount of data to transfer from a plurality of level 3 queues to the plurality of level 2 queues based on the occupancy rate of the plurality of level 2 queues and a backlog in the plurality of 3 queues; and
transferring the calculated amount of data from the level 3 queues to the level 2 queues.

2. The method of claim 1, wherein generating the backlog report comprises:
calculating a volume of data in level 2 queues; and
calculating a volume of data in level 3 queues.

3. The method of claim 1, wherein the backlog report comprises a backlog of data for a plurality of traffic priorities.

4. The method of claim 2, wherein calculating the volume of data in the level 3 queues is done according to:

$$V_{L3} = \sum_{i=1}^{M} V_{L3}^{(i)} = \sum_{i=1}^{M} \left[ \sum_{j=1}^{N_i} q_{ij} + Q_i^{(2)} + Q_i^{(3)} + Q_{PBP,i} \right]$$

where $V_{L3}$ is the volume of data in level 3 queues, $N_i$ is a number of flows in an i-th priority class, i=1, ..., M, $q_{ij}$ is a length of a TCP spoofing queue for priority class i and flow j, 1, ..., M, j=1, ..., $N_i$, $$Q_i^{(k=1)} = \sum_{j=1}^{N_i} q_{ij},$$

where k=1, is an mount of spoofed traffic, $Q_i^{(k=2)}$ is an aggregated queue length of IPLR traffic, $Q_i^{(k=3)}$ is an aggregated queue length of unspoofed traffic, i=1, ..., M, $Q_{PBP,i}$ is a PBP queue size for priority class i.

5. The method of claim 2, wherein calculating the volume of data in the level 2 queues is done according to:

$$V_{L2} = \sum_{i=1}^{M} V_{L2}^{(i)}$$

where $V_{L2}$ is the volume of data in level 2 queues, $V_{L2}^{(i)}$ is a volume of data in a level 2 queue for priority class i, i=1, ..., M.

6. The method of claim 2, wherein the level 2 queues comprise a plurality of priority queues, wherein each priority queue comprises data traffic of a different priority level.

7. The method of claim 6, wherein there is a priority queue for interactive traffic, a priority queue for bulk traffic, and a priority queue for streaming traffic.

8. The method of claim 2, wherein the level 3 queues comprise a plurality of unspoofed priority queues, a plurality of IPLR priority queues, a plurality of TCP-spoof priority queues, a plurality of TCP spoofing queues, and plurality of PBP priority queues.

9. A method for inroute bandwidth allocation supporting multiple traffic priorities in a satellite network comprising:
receiving backlog reports from a plurality of VSATs;
calculating a bandwidth allocation for each of the VSATs in the plurality of VSATs; and
transmitting the bandwidth allocation to each of the plurality of VSATs, wherein calculating the bandwidth allocations comprises:
calculating a bandwidth allocation at a priority level across all of the VSATs; and
calculating a bandwidth allocation for each VSAT based on the bandwidth allocation at the priority level, wherein calculating a bandwidth allocation at the priority level comprises:
determining a budget for each of a plurality of priority classes across a plurality of frames, wherein the priority classes are ordered from a highest priority class to a lowest priority class, and wherein the budget for a priority class is calculated based on a weights for the priority class and an amount of bandwidth left from a total available amount of bandwidth after calculating a budget for all of the higher priority classes;
allocating bandwidth each of the priority classes, from the highest priority class to the lowest priority class, wherein bandwidth allocated to a priority class is based on the available bandwidth left from the total available amount of bandwidth after allocating bandwidth to all of the higher priority classes, the budget for the priority class, a reported backlog for the priority class, and a carryover of unused bandwidth previously budgeted for the priority class; and
allocating additional bandwidth to each of the priority classes, from the highest priority class to the lowest priority class, where the additional bandwidth for a priority class is any bandwidth not assigned to a higher priority class up to the amount of bandwidth required to clear the backlog for the priority class.

10. A method for inroute bandwidth allocation supporting multiple traffic priorities in a satellite network comprising:
receiving backlog reports from a plurality of VSATs;
calculating a bandwidth allocation for each of the VSATs in the plurality of VSATs; and
transmitting the bandwidth allocation to each of the plurality of VSATs, wherein calculating the bandwidth allocations comprises:
calculating a bandwidth allocation at a priority level across all of the VSATs; and
calculating a bandwidth allocation for each VSAT based on the bandwidth allocation at the priority level, wherein calculating the bandwidth allocation for each VSAT based on the bandwidth allocation at the priority level comprises:
updating virtual queues to mirror a reported backlog at priority queues at the VSATs;
calculating a bandwidth allocation for each priority level at each VSAT using proportional fair scheduling based on the virtual queues, a throughput to service plan ratio for each of the VSATs, and the bandwidth allocation at the priority level; and
calculating a bandwidth allocation for each VSAT based on the bandwidth allocation for each priority level for each VSAT and an allocation of leftover bandwidth.

11. The method of claim 10, wherein bandwidth is allocated for each priority level at each VSAT from highest priority level to lowest priority level and from a VSAT with a lowest throughput to service plan ratio to a VSAT with the highest throughput to service plan ratio.

12. A system inroute bandwidth allocation supporting multiple traffic priorities in a satellite network comprising:

a satellite;

a VSAT population comprising VSATs, wherein each VSAT is configured to send data to and receive data from a gateway through the satellite, generate a backlog report, receive a bandwidth allocation from an inroute group manager, service priority queues at the VSAT using the bandwidth allocation, and transmit data to the satellite based on the bandwidth allocation; and a gateway comprising an inroute group manager, the gateway configured to receive data from the VSAT population through the satellite, receive backlog reports from the VSAT population, and allocate bandwidth to the VSATs in the VSAT population with the inroute group manager, and send the bandwidth allocation to the VSAT population through the satellite, wherein the VSATs are configured to service the priority queues by allocating bandwidth from the bandwidth allocation to a plurality of level 2 queues based on a backlog of the level 2 queues and a weight for each of the level 2 queues, transmitting data from the level 2 queues to the satellite according to the bandwidth allocated to each of the level 2 queues, determining an occupancy rate of the plurality of level 2 queues, calculating an amount of data to transfer from a plurality of level 3 queues to the plurality of level 2 queues based on the occupancy rate of the plurality of level 2 queues and a backlog in the plurality of 3 queues, and transferring the calculated amount of data from the level 3 queues to the level 2 queues.

13. The system of claim 12, wherein the VSATs are further configured to generate the backlog report by calculating a volume of data in level 2 queues and calculating a volume of data in level 3 queues.

14. The system of claim 13, wherein the VSATs are configured to calculate the volume of data in the level 3 queues according to:

$$V_{L3} = \sum_{i=1}^{M} V_{L3}^{(i)} = \sum_{i=1}^{M} \left[ \sum_{j=1}^{N_i} q_{ij} + Q_i^{(2)} + Q_i^{(3)} + Q_{PBP,i} \right]$$

where $V_{L3}$ is the volume of data in level 3 queues, $N_i$ is a number of flows in an i-th priority class, $i=1, \ldots, M$, $q_{ij}$ is a length of a TCP spoofing queue for priority class i and flow j, $i=1, \ldots, M$ $j=1, \ldots, N_i$, $$Q_i^{(k=1)} = \sum_{j=1}^{N_i} q_{ij},$$

where k=1, is an mount of spoofed traffic, $Q_i^{(k=2)}$ is an aggregated queue length of IPLR traffic, $Q_i^{(k=3)}$ is an aggregated queue length of unspoofed traffic, $i=1, \ldots, M$ $Q_{PBP,i}$ is a PBP queue size for priority class i.

15. The system of 13, wherein the VSATs are configured to calculate the volume of data in the level 2 queues according to:

$$V_{L2} = \sum_{i=1}^{M} V_{L2}^{(i)}$$

where $V_{L2}$ is the volume of data in level 2 queues, $V_{L2}^{(i)}$ is a volume of data in a level 2 queue for priority class i, $i=1, \ldots, M$.

16. The system of claim 13, wherein the level 2 queues comprise a plurality of priority queues, wherein each priority queue comprises data traffic of a different priority level.

17. The system of claim 16, wherein there is a priority queue for interactive traffic, a priority queue for bulk traffic, and a priority queue for streaming traffic.

18. The system of claim 13, wherein the level 3 queues comprise a plurality of unspoofed priority queues, a plurality of IPLR priority queues, a plurality of TCP-spoof priority queues, a plurality of TCP spoofing priority queues, and plurality of PBP priority queues.

19. The system of claim 12, wherein the backlog report comprises a backlog of data for a plurality of traffic priorities.

20. The system of claim 12, wherein the gateway is configured to calculate the bandwidth allocations with the inroute group manager by calculating a bandwidth allocation at a priority level across all of the VSATs, and calculating a bandwidth allocation for each VSAT based on the bandwidth allocation at the priority level.

21. A system inroute bandwidth allocation supporting multiple traffic priorities in a satellite network comprising:

a satellite;

a VSAT population comprising VSATs, wherein each VSAT is configured to send data to and receive data from a gateway through the satellite, generate a backlog report, receive a bandwidth allocation from an inroute group manager, service priority queues at the VSAT using the bandwidth allocation, and transmit data to the satellite based on the bandwidth allocation; and a gateway comprising an inroute group manager, the gateway configured to receive data from the VSAT population through the satellite, receive backlog reports from the VSAT population, and allocate bandwidth to the VSATs in the VSAT population with the inroute group manager, and send the bandwidth allocation to the VSAT population through the satellite, wherein the gateway is configured to calculate the bandwidth allocations with the inroute group manager by calculating a bandwidth allocation at a priority level across all of the VSATs, and calculating a bandwidth allocation for each VSAT based on the bandwidth allocation at the priority level, and wherein the inroute group manager is configured to calculate a bandwidth allocation at the priority level by determining a budget across a plurality of frames for each of a plurality of priority classes, wherein the priority classes are ordered from a highest priority class to a lowest priority class, and wherein the budget for a priority class is calculated based on a weights for the priority class and an amount of bandwidth left from a total available amount of bandwidth after calculating a budget for all of the higher priority classes, allocating bandwidth each of the priority classes, from the highest priority class to the lowest priority class, wherein bandwidth allocated to a priority class is based on the available bandwidth left from the total available amount of bandwidth after allocating bandwidth to all of the higher priority classes, the budget for the priority class, a reported backlog for the priority class, and a carryover of unused bandwidth previously budgeted for the priority class, and allocating additional bandwidth to each of the priority classes, from the highest priority class to the lowest priority class, where the additional bandwidth for a priority class is any bandwidth not assigned to a higher priority class up to the amount of bandwidth required to clear the backlog for the priority class.

22. A system inroute bandwidth allocation supporting multiple traffic priorities in a satellite network comprising:
a satellite;
a VSAT population comprising VSATs, wherein each VSAT is configured to send data to and receive data from a gateway through the satellite, generate a backlog report, receive a bandwidth allocation from an inroute group manager, service priority queues at the VSAT using the bandwidth allocation, and transmit data to the satellite based on the bandwidth allocation; and
a gateway comprising an inroute group manager, the gateway configured to receive data from the VSAT population through the satellite, receive backlog reports from the VSAT population, and allocate bandwidth to the VSATs in the VSAT population with the inroute group manager, and send the bandwidth allocation to the VSAT population through the satellite,
wherein the gateway is configured to calculate the bandwidth allocations with the inroute group manager by calculating a bandwidth allocation at a priority level across all of the VSATs, and calculating a bandwidth allocation for each VSAT based on the bandwidth allocation at the priority level, and
wherein the inroute group manager is further configured to calculate the bandwidth allocation for each VSAT based on the bandwidth allocation at the priority level comprises by updating virtual queues to minor a reported backlog at priority queues at the VSATs, calculating a bandwidth allocation for each priority level at each VSAT using proportional fair scheduling based on the virtual queues, a throughput to service plan ratio for each of the VSATs, and the bandwidth allocation at the priority level, and calculating a bandwidth allocation for each VSAT based on the bandwidth allocation for each priority level for each VSAT and an allocation of leftover bandwidth.

23. The system of claim 22, wherein bandwidth is allocated for each priority level at each VSAT from highest priority level to lowest priority level and from a VSAT with a lowest throughput to service plan ratio to a VSAT with the highest throughput to service plan ratio.

24. A method for inroute bandwidth allocation supporting multiple traffic priorities in a satellite network comprising:
generating a backlog report;
transmitting the backlog report to an inroute group manager;
receiving a bandwidth allocation from the inroute group manager; and
servicing priority queues and transmitting data to a satellite based on the bandwidth allocation from the inroute group manager, wherein generating the backlog report comprises:
calculating a volume of data in level 2 queues; and
calculating a volume of data in level 3 queues, wherein calculating the volume of data in the level 3 queues is done according to:

$$V_{L3} = \sum_{i=1}^{M} V_{L3}^{(i)} = \sum_{i=1}^{M}\left[\sum_{j=1}^{N_i} q_{ij} + Q_i^{(2)} + Q_i^{(3)} + Q_{PBP,i}\right]$$

where $N_i$ is a number of flows in an i-th priority class, i=1, ..., M, $q_{ij}$ is a length of a TCP spoofing queue for priority class i and flow j, i=1, ..., M, j=1, ..., $N_i$, $$Q_i^{(k=1)} = \sum_{j=1}^{N_i} q_{ij},$$

where k=1, is an mount of spoofed traffic, $Q_i^{(k=2)}$ is an aggregated queue length of IPLR traffic, $Q_i^{(k=3)}$ is an aggregated queue length of unspoofed traffic, i=1, ..., M, $Q_{PBP,i}$ is a PBP queue size for priority class i.

25. A method for inroute bandwidth allocation supporting multiple traffic priorities in a satellite network comprising:
generating a backlog report;
transmitting the backlog report to an inroute group manager;
receiving a bandwidth allocation from the inroute group manager; and
servicing priority queues and transmitting data to a satellite based on the bandwidth allocation from the inroute group manager, wherein generating the backlog report comprises:
calculating a volume of data in level 2 queues; and
calculating a volume of data in level 3 queues, wherein the level 3 queues comprise a plurality of unspoofed priority queues, a plurality of IPLR priority queues, a plurality of TCP-spoof priority queues, a plurality of TCP spoofing queues, and plurality of PBP priority queues.

26. A system inroute bandwidth allocation supporting multiple traffic priorities in a satellite network comprising:
a satellite;
a VSAT population comprising VSATs, wherein each VSAT is configured to send data to and receive data from a gateway through the satellite, generate a backlog report, receive a bandwidth allocation from an inroute group manager, service priority queues at the VSAT using the bandwidth allocation, and transmit data to the satellite based on the bandwidth allocation; and
a gateway comprising an inroute group manager, the gateway configured to receive data from the VSAT population through the satellite, receive backlog reports from the VSAT population, and allocate bandwidth to the VSATs in the VSAT population with the inroute group manager, and send the bandwidth allocation to the VSAT population through the satellite,
wherein the VSATs are configured to generate the backlog report by calculating a volume of data in level 2 queues and calculating a volume of data in level 3 queues,
wherein the VSATs are configured to calculating the volume of data in the level 3 queues according to:

$$V_{L3} = \sum_{i=1}^{M} V_{L3}^{(i)} = \sum_{i=1}^{M}\left[\sum_{j=1}^{N_i} q_{ij} + Q_i^{(2)} + Q_i^{(3)} + Q_{PBP,i}\right]$$

where $V_{L3}$ is the volume of data in level 3 queues, $N_i$ is a number of flows in an i-th priority class, i=1, ..., M, $q_{ij}$ is a length of a TCP spoofing queue for priority class i and flow j, i=1, ..., M, j=1, ..., $N_i$, $$Q_i^{(k=1)} = \sum_{j=1}^{N_i} q_{ij},$$

where k=1, is an mount of spoofed traffic, $Q_i^{(k=2)}$ is an aggregated queue length of IPLR traffic, $Q_i^{(k=3)}$ is an aggregated queue length of unspoofed traffic, i=1, ..., M, $Q_{PBP,i}$ is a PBP queue size for priority class i.

27. A system inroute bandwidth allocation supporting multiple traffic priorities in a satellite network comprising:
    a satellite;
    a VSAT population comprising VSATs, wherein each VSAT is configured to send data to and receive data from a gateway through the satellite, generate a backlog report, receive a bandwidth allocation from an inroute group manager, service priority queues at the VSAT using the bandwidth allocation, and transmit data to the satellite based on the bandwidth allocation; and
    a gateway comprising an inroute group manager, the gateway configured to receive data from the VSAT population through the satellite, receive backlog reports from the VSAT population, and allocate bandwidth to the VSATs in the VSAT population with the inroute group manager, and send the bandwidth allocation to the VSAT population through the satellite,
    wherein the VSATs are configured to generate the backlog report by calculating a volume of data in level 2 queues and calculating a volume of data in level 3 queues, and
    wherein the level 3 queues comprise a plurality of unspoofed priority queues, a plurality of IPLR priority queues, a plurality of TCP-spoof priority queues, a plurality of TCP spoofing priority queues, and plurality of PBP priority queues.

* * * * *